US009903338B2

(12) United States Patent
Lin et al.

(10) Patent No.: US 9,903,338 B2
(45) Date of Patent: Feb. 27, 2018

(54) WIND TURBINE BLADE AND METHOD OF ASSEMBLING THE SAME

(71) Applicant: General Electric Company, Schenectady, NY (US)

(72) Inventors: Wendy Wen-Ling Lin, Montgomery, OH (US); Anurag Gupta, Manvel, TX (US)

(73) Assignee: General Electric Company, Niskayuna, NY (US)

( * ) Notice: Subject to any disclaimer, the term of this patent is extended or adjusted under 35 U.S.C. 154(b) by 706 days.

(21) Appl. No.: 14/107,632

(22) Filed: Dec. 16, 2013

(65) Prior Publication Data

US 2015/0167472 A1 Jun. 18, 2015

(51) Int. Cl.
| F03D 1/06 | (2006.01) |
| F01D 5/14 | (2006.01) |
| F03D 7/02 | (2006.01) |

(52) U.S. Cl.
CPC ......... *F03D 1/0675* (2013.01); *F03D 7/0236* (2013.01); *F05B 2240/2021* (2013.01); *Y02E 10/721* (2013.01); *Y02E 10/723* (2013.01); *Y10T 29/49336* (2015.01)

(58) Field of Classification Search
CPC ................. F03D 1/0675; F03D 7/0236; F05B 2240/2021
USPC .......................................................... 416/84
See application file for complete search history.

(56) References Cited

U.S. PATENT DOCUMENTS

| 3,664,764 | A | | 5/1972 | Davies et al. |
| 4,787,405 | A | * | 11/1988 | Karwoski ................ A45B 3/00 |
| | | | | 135/65 |
| 5,460,676 | A | * | 10/1995 | Jensen .................. B29C 53/585 |
| | | | | 102/293 |
| 5,725,709 | A | * | 3/1998 | Jensen .................... B29C 70/30 |
| | | | | 156/155 |
| 6,972,498 | B2 | | 12/2005 | Jamieson et al. |
| 7,131,812 | B2 | * | 11/2006 | Brueckner ................ F03D 1/02 |
| | | | | 415/191 |
| 7,740,453 | B2 | | 6/2010 | Zirin et al. |
| 7,755,210 | B2 | | 7/2010 | Kammer et al. |
| 7,841,835 | B2 | | 11/2010 | Bagepalli et al. |
| 7,891,947 | B2 | | 2/2011 | Chen et al. |
| 7,976,275 | B2 | | 7/2011 | Miebach et al. |

(Continued)

FOREIGN PATENT DOCUMENTS

| EP | 2208885 A2 | 7/2010 |
| EP | 2243953 A2 | 10/2010 |

(Continued)

OTHER PUBLICATIONS

Joseph A. Grande, "Wind Power Blades Energize Composites Manufacturing", Plastics Technology, Oct. 2008, 7 pages.

(Continued)

*Primary Examiner* — Woody Lee, Jr.
*Assistant Examiner* — Brian O Peters
(74) *Attorney, Agent, or Firm* — Nitin N. Joshi

(57) ABSTRACT

A wind turbine blade is provided. The wind turbine blade includes a first section and a second section adjacent the first section. At least one of the first section and the second section includes a skin segment and a network of support members disposed within the skin segment. The network of support members is configured for expansion.

16 Claims, 5 Drawing Sheets

(56) References Cited

U.S. PATENT DOCUMENTS

| | | | |
|---|---|---|---|
| 7,998,303 B2 | 8/2011 | Baehmann et al. | |
| 8,104,713 B2* | 1/2012 | Sanderson | B64C 3/30 |
| | | | 244/123.11 |
| 8,171,633 B2 | 5/2012 | Zirin et al. | |
| 8,336,830 B2* | 12/2012 | Eberhardt | B64C 3/54 |
| | | | 244/123.11 |
| 8,382,440 B2 | 2/2013 | Baker et al. | |
| 8,882,466 B2* | 11/2014 | Stiesdal | F03D 1/065 |
| | | | 416/146 R |
| 2003/0233916 A1* | 12/2003 | Kozak | B25B 9/00 |
| | | | 81/439 |
| 2009/0304507 A1* | 12/2009 | Dehlsen | F03D 1/0675 |
| | | | 416/87 |
| 2010/0122442 A1 | 5/2010 | Kirkpatrick et al. | |
| 2010/0132884 A1 | 6/2010 | Baehmann et al. | |
| 2010/0140940 A1 | 6/2010 | Kammer et al. | |
| 2010/0143148 A1 | 6/2010 | Chen et al. | |
| 2011/0142667 A1 | 6/2011 | Miebach et al. | |
| 2011/0176928 A1 | 7/2011 | Jensen | |
| 2012/0141287 A1 | 6/2012 | Hynum et al. | |
| 2012/0237759 A1 | 9/2012 | Ehbing et al. | |
| 2012/0263595 A1 | 10/2012 | Evans et al. | |
| 2012/0273617 A1 | 11/2012 | Jensen | |

FOREIGN PATENT DOCUMENTS

| | | |
|---|---|---|
| EP | 2264310 A2 | 12/2010 |
| KR | 101175953 B1 | 8/2012 |

OTHER PUBLICATIONS

Richard A. Stewart, "Wind Turbine Blade Production—New Products Keep Pace as Scale Increases", Reinforced plastics, Jan./Feb. 2012, 8 pages.

B.A. Lerch et al., "Analysis of Stainless Steel Sandwich Panels with a Metal Foam Core for Lightweight Fan Blade Design", 2004, Issue 0505, 1 page.

* cited by examiner

WIND TURBINE BLADE AND METHOD OF ASSEMBLING THE SAME

BACKGROUND

The subject matter described herein relates generally to wind turbines and, more particularly, to blades for use on a wind turbine.

Many known wind turbines include a tower and a rotor mounted on the tower using a nacelle. The rotor includes a number of blades that rotate to drive a generator through a gearbox using a rotor shaft, and the gearbox steps up the inherently low rotational speed of the rotor shaft such that the generator may convert the mechanical energy to electrical energy.

The swept area of the rotor is directly correlated with the power output of the wind turbine. Given that the swept area is essentially equal to the area of a circle (as calculated by the formula $\pi r^2$) for which the length of each blade essentially defines the radius, an increase in the blade length tends to increase the power output potential of the wind turbine, and a decrease in the blade length tends to decrease the power output potential of the wind turbine. As such, increasing the blade length is sometimes desirable. However, the blades are often manufactured away from the installation site of the wind turbine, and blade transportation costs have been known to constrain the blade length increase and, therefore, the swept area and the power output potential of a wind turbine.

BRIEF DESCRIPTION

In one aspect, a wind turbine blade is provided. The wind turbine blade includes a first section and a second section adjacent the first section. At least one of the first section and the second section includes a skin segment and a network of support members disposed within the skin segment. The network of support members is configured for expansion.

In another aspect, a wind turbine is provided. The wind turbine includes a tower and a rotor mounted on the tower. The rotor includes a hub and a plurality of blades extending from the hub. One of the blades has a first section and a second section adjacent the first section. At least one of the first section and the second section includes a skin segment and a network of support members disposed within the skin segment. The network of support members is configured for expansion.

In another aspect, a method of assembling a wind turbine blade is provided. The method includes providing a collapsed network of support members for a section of the blade. The method further includes attaching a skin segment to the network of support members such that the network of support members is disposed within the skin segment. The network of support members is configured for expansion to tension the skin segment such that an interior space is defined between the skin segment and the expanded network of support members.

DRAWINGS

These and other features, aspects, and advantages of the present disclosure will become better understood when the following detailed description is read with reference to the accompanying drawings in which like characters represent like parts throughout the drawings, wherein.

Figure 1:
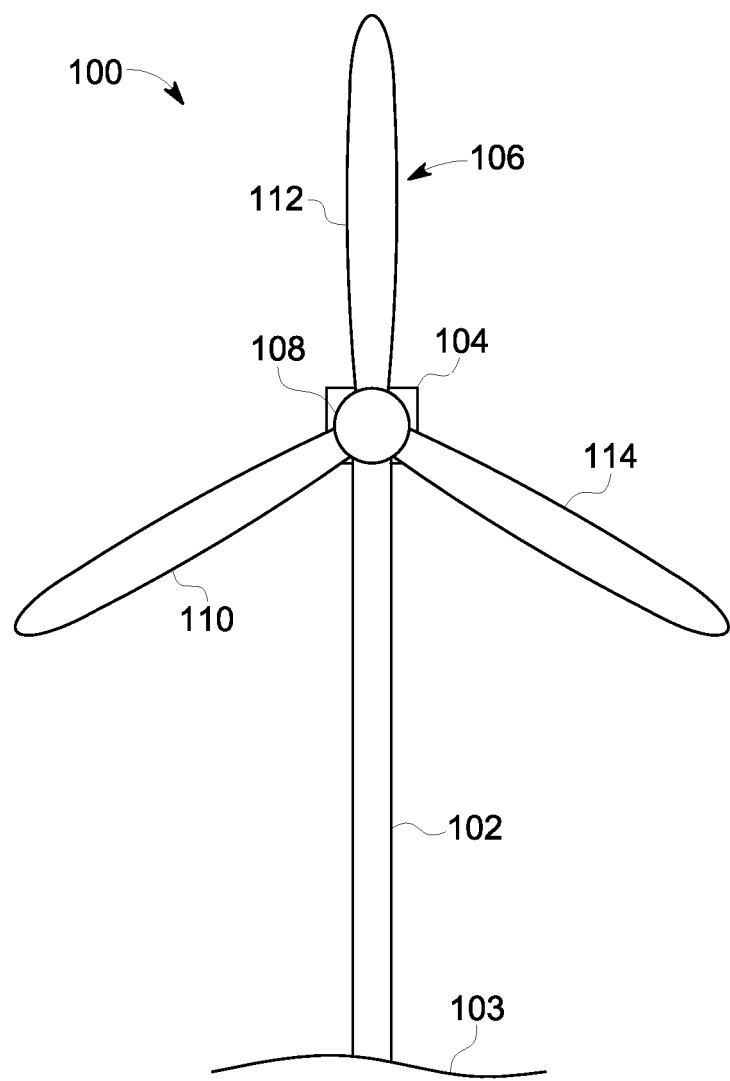
FIG. 1 is a schematic view of an exemplary wind turbine.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

The embodiments disclosed herein facilitate providing a lightweight wind turbine blade that may be manufactured in a modular fashion. The devices, systems, and methods also facilitate improving the portability of wind turbine components such as, for example, outboard blade extensions and portable wind turbines as a whole, e.g., for use in providing distributed or tactical military power. The embodiments set forth herein further facilitate enhancing logistics and easing transportation/installation of a wind turbine in a manner that enables some sections of a blade to be finished in a more controlled environment away from an installation site, with other sections of the blade being finished at the installation site in a less controlled environment. Additionally, the disclosed devices, systems, and methods facilitate customizing the structural characteristics of an outboard blade section at the installation site (or on-demand during operation of the wind turbine) to suit local wind conditions, expected annual energy production (AEP), desired noise, and/or desired business value. The embodiments disclosed herein also facilitate utilizing a "thorny" spine that is optionally made from a high-strength composite material to provide increased load-transferring contact with a lightweight foam filler material that serves a shape-filling function. Such filler material may be contained within one or more bladders disposed within an outer skin made of modern high-performance fiber that provides surface integrity. The embodiments further facilitate injecting a lightweight filler, e.g., without limitation, a foam or a gas, into a blade skin in-situ to provide rigidity for transferring operational loads to structural elements of the blade.

FIG. 1 is a schematic illustration of an exemplary wind turbine 100. In the exemplary embodiment, wind turbine 100 is a horizontal axis wind turbine that includes a tower 102 erected from a foundation 103, a nacelle 104 mounted on tower 102, and a rotor 106 that is rotatable relative to nacelle 104. Rotor 106 includes a hub 108 and a plurality of blades extending outward from hub 108, namely a first blade 110, a second blade 112, and a third blade 114 that are substantially equidistantly spaced about hub 108. In alternative embodiments, rotor 106 may include any suitable number of blades 110, 112, and 114 spaced any suitable distance from one another about hub 108. Unless otherwise specified herein, the various components shown in FIG. 1 (and FIGS. 2-5) are not intended to be drawn to scale, e.g., some components may be shown as being larger for ease of viewing.

Figure 2:
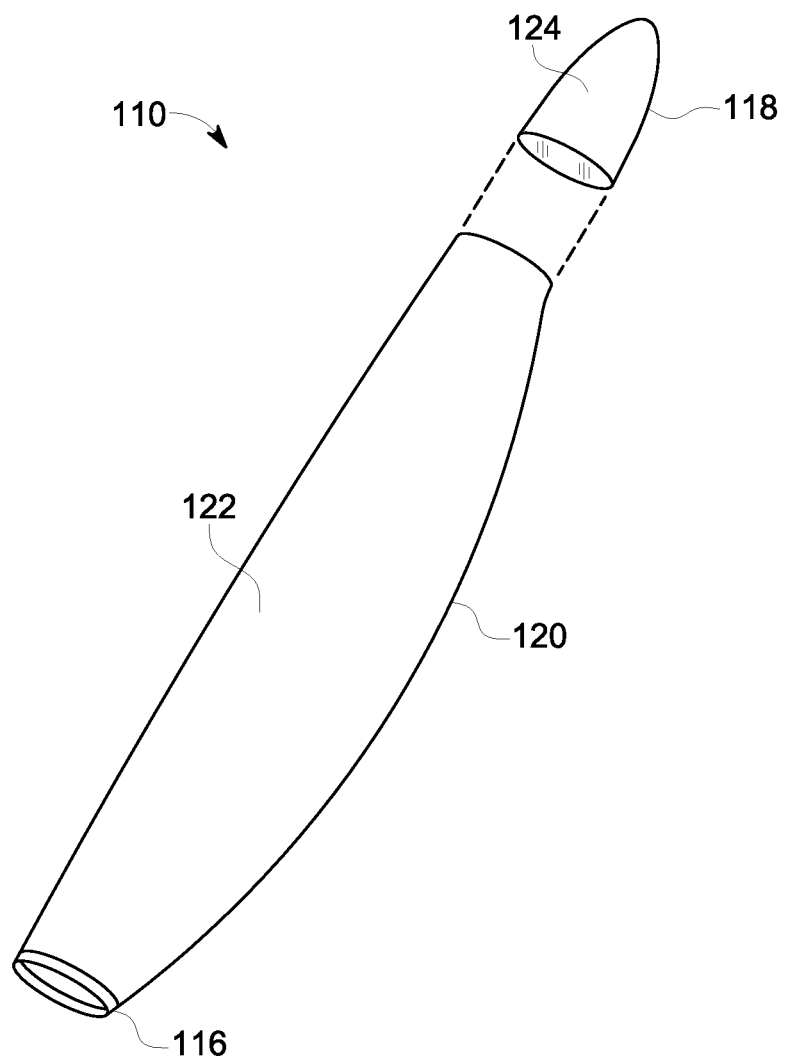
FIG. 2 is an exploded view of an exemplary blade of the wind turbine shown in FIG. 1.

FIG. 2 is an exploded view of an exemplary first blade 110. In the exemplary embodiment, first blade 110 has a plurality of sections, namely a root 116, a tip 118, and a body 120 extending from root 116 to tip 118. Additionally, first blade 110 has an airfoil-shaped profile defined (on body 120) by a body skin segment 122 and (on tip 118) by a tip skin segment 124. In other embodiments, first blade 110 may have any suitable profile shape that facilitates enabling first blade 110 to function as described herein. In the exemplary embodiment, root 116 is formed integrally together with body 120 and is suitably configured for operative connection to hub 108, and tip 118 is formed separately from (and is suitably attachable to) body 120 as set forth in more detail below. As used herein, the term "formed integrally together" or any variation thereof refers to being formed as one piece, e.g., without limitation, using a molding process, and does not refer to being formed as separate pieces that are subsequently joined together, e.g., without limitation, by a bolting or welding process. Moreover, it should be noted that, while first blade 110 is described in more detail herein, second blade 112 and third blade 114 may be configured in the same manner as first blade 110, e.g., without limitation, second blade 112 and third blade 114 may have respective tips 118 and bodies 120 that are configured in the same manner as tip 118 and body 120 of first blade 110.

Figure 3:
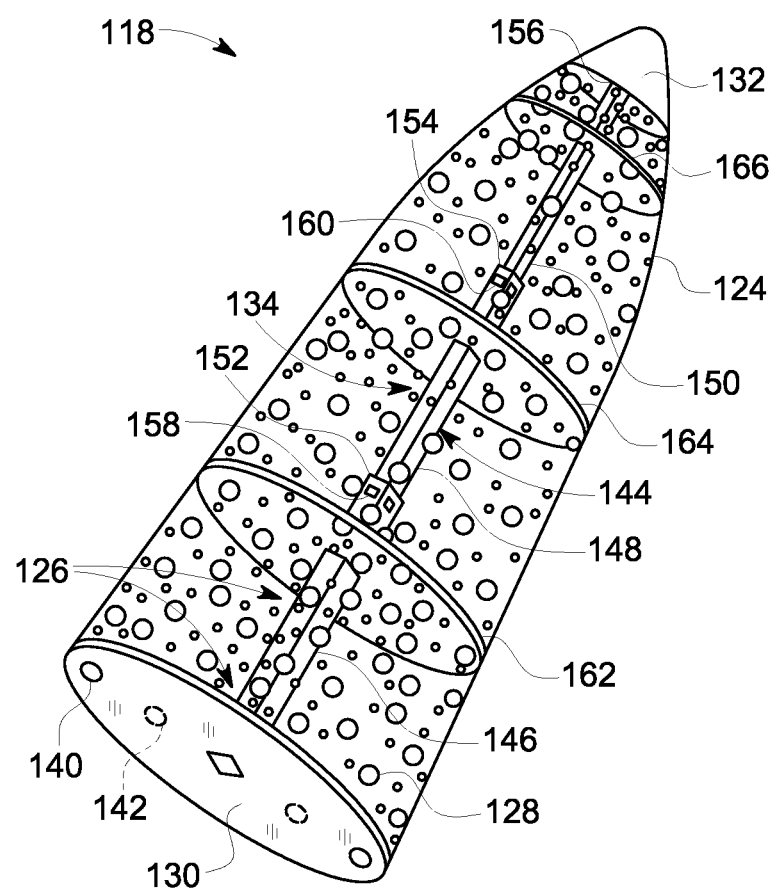
FIG. 3 is a perspective view of an exemplary tip of the blade shown in FIG. 2.

FIG. 3 is a perspective view of tip 118 in a completely assembled state, with tip skin segment 124 being mostly transparent for ease of internal viewing. In the exemplary embodiment, tip 118 has a structural frame 126 and a filler material 128 disposed between tip skin segment 124 and structural frame 126. Structural frame 126 includes a base flange 130, a distal support member 132, and an expandable network 134 (or skeleton) of intermediate support members extending from base flange 130 to distal support member 132. In other embodiments, structural frame 126 may have any suitable number of structural components arranged in any suitable manner that facilitates enabling structural frame 126 to function as described herein. As used herein, a network being "configured for expansion" means that either the network is currently in a collapsed state and is subsequently expandable from the collapsed state into an expanded state, or the network is currently in an expanded state (e.g., has been irreversibly fixed in the expanded state) but was previously expandable from a collapsed state into the expanded state.

In the exemplary embodiment, base flange 130 has a plate-like shape and includes a plurality of bolt holes 140 such that base flange 130 is configured for bolted connection to body 120. Additionally, base flange 130 includes at least one port 142 for injecting filler material 128 through base flange 130 and into tip skin segment 124, as set forth in more detail below. Alternatively, other embodiments of base flange 130 may have any suitable shape that is not plate-like, and base flange 130 may be configured for attachment to body 120 in a manner other than a bolted connection (such as, for example, an adhesive connection). Moreover, tip 118 may be configured such that port(s) 142 are located elsewhere on tip 118 (in addition to, or in lieu of, those ports 142 that are located on base flange 130), and base flange 130 may be fabricated from any suitable material, e.g., without limitation, a metallic material.

In the exemplary embodiment, network 134 of intermediate support members includes a spine 144 that has a plurality of spine segments, namely a first spine segment 146, a second spine segment 148, and a third spine segment 150 connected together and collectively extending substantially perpendicularly outward from base flange 130. More specifically, first spine segment 146 is rigidly connected to base flange 130 and extends from base flange 130 to a first distal end 152. Second spine segment 148 is telescopically received within first spine segment 146 and extends outward from first spine segment 146 to a second distal end 154 that remains outside of first spine segment 146. Third spine segment 150 is telescopically received within second spine segment 148 and extends outward from second spine segment 148 to a third distal end 156 that remains outside of second spine segment 148, and distal support member 132 is rigidly connected to third distal end 156 of third spine segment 150. In this manner, spine 144 is expandable in that the extension of second spine segment 148 from first spine segment 146 is variable, and the extension of third spine segment 150 from second spine segment 148 is variable. Suitably, spine segments 146, 148, and 150 may be fabricated from any material that facilitates enabling spine segments 146, 148, and 150 to function as described herein such as, for example, a metallic material or a composite material.

A first locking mechanism 158 and a second locking mechanism 160 are provided on spine 144 for locking spine segments 146, 148, and 150 in position relative to one another. Particularly, first locking mechanism 158 is configured to resist retraction of second spine segment 148 into first spine segment 146 after second spine segment 148 has assumed a protracted position, and second locking mechanism 160 is configured to resist retraction of third spine segment 150 into second spine segment 148 after third spine segment 150 has assumed a protracted position. In the exemplary embodiment, first locking mechanism 158 includes at least one aperture disposed on first spine segment 146 near first distal end 152, and at least one spring-loaded detent disposed on second spine segment 148 for engaging the aperture(s) of first spine segment 146 to facilitate maintaining the protracted position of second spine segment 148 relative to first spine segment 146. Similarly, second locking mechanism 160 includes at least one aperture disposed on second spine segment 148 near second distal end 154, and at least one spring-loaded detent disposed on third spine segment 150 for engaging the aperture(s) of second spine segment 148 to facilitate maintaining the protracted position of third spine segment 150 relative to second spine segment 148.

In the exemplary embodiment, network 134 of intermediate support members also includes a plurality of airfoil-shaped ribs, namely a first rib 162, a second rib 164, and a third rib 166. First rib 162 is rigidly connected to first spine segment 146 near first distal end 152 such that first rib 162 is oriented substantially perpendicular to first spine segment 146, i.e., first rib 162 is oriented substantially parallel to base flange 130. Similarly, second rib 164 is rigidly connected to second spine segment 148 near second distal end 154 such that second rib 164 is oriented substantially perpendicular to second spine segment 148, i.e., second rib 164 is oriented substantially parallel to first rib 162. Additionally, third rib 166 is rigidly connected to third spine segment 150 near third distal end 156 and distal support member 132 such that third rib 166 is oriented substantially perpendicular to third spine segment 150, i.e., third rib 166 is oriented substantially parallel to second rib 164. Notably, to facilitate providing tip skin segment 124 with a smoothly tapering airfoil shape when tip 118 is completely assembled, first rib 162 is larger than second rib 164, and second rib 164 is larger than third rib 166 which is, in turn, larger than distal support member 132. Moreover, in other embodiments, network 134 may have any suitable number of spine segments and ribs having any suitable shapes and arranged in any suitable manner that facilitates enabling tip 118 to function as described herein.

In the exemplary embodiment, tip skin segment 124 is a pre-tensioned, sheath-like covering that is fixedly attached to base flange 130 and wraps over (or is fixedly attached to) distal support member 132, completely enveloping network 134 from base flange 130 to distal support member 132. Optionally, tip skin segment 124 may also be fixedly attached to first rib 162, second rib 164, and/or third rib 166 to facilitate a more incrementally applied tension of tip skin segment 124 along the entire length of tip 118. Moreover, tip skin segment 124 may be fabricated from any material that is suitably pliable (or limp) enough to render tip skin segment 124 foldable when tip 118 is in the collapsed state described below, i.e., prior to the tensioning of tip skin segment 124. In the exemplary embodiment, tip skin segment 124 is fabricated from a fluid impermeable material. For example, tip skin segment 124 may be fabricated from a silicone-coated (or rubber-coated), glass or polymeric-fiber fabric material (such as a polyester material) that has been processed to enhance the integrity/protection and surface definition of the material, e.g., without limitation, by virtue of layered coatings or treatments that optimize material properties such as erosion resistance, water-ice resistance, UV-resistance, fluid impermeability, and surface finish.

Figure 5:
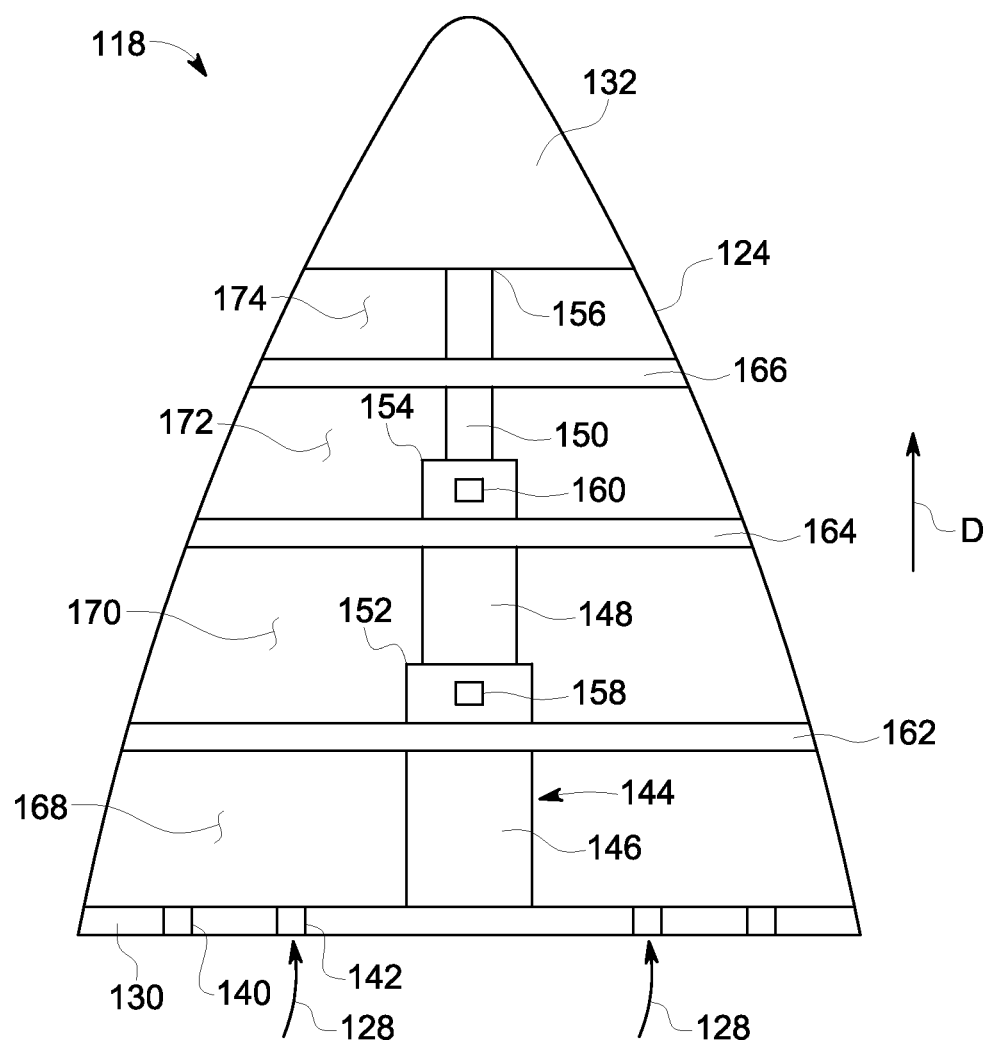
FIG. 5 is a schematic view of the tip shown in FIG. 3 in an expanded state of assembly.

By enveloping network 134, tip skin segment 124 defines a first interior space 168 (as shown in FIG. 5) that extends about spine 144 between base flange 130 and first rib 162, and a second interior space 170 (as shown in FIG. 5) that extends about spine 144 between first rib 162 and second rib 164. Additionally, tip skin segment 124 further defines a third interior space 172 (as shown in FIG. 5) that extends about spine between second rib 164 and third rib 166, and a fourth interior space 174 (as shown in FIG. 5) that extends about spine 144 between distal support member 132 and third rib 166. Moreover, as shown in FIG. 3, filler material 128 occupies first interior space 168, second interior space 170, third interior space 172, and fourth interior space 174 when tip 118 is completely assembled, thereby helping to maintain the airfoil shape of tip skin segment 124 during operation of wind turbine 100 as set forth in more detail below.

In the exemplary embodiment, filler material 128 is an expandable foam material that has been injected into interior spaces 168, 170, 172, and 174 using port(s) 142 and has been permitted to cure, thereby embedding spine 144 and ribs 162, 164, and 166 within cured filler material 128. For example, in one embodiment, filler material 128 may be a rubberized foam that is injectable and, when cured, is rigid enough to maintain its shape, but is compressible enough so as to resist fracturing under loads experienced by first blade 110 during operation of wind turbine 100. Notably, ribs 162, 164, and 166 and/or spine 144 may be configured such that interior spaces 168, 170, 172, and 174 are in fluid communication with one another, enabling filler material 128 injected into first interior space 168 using port(s) 142 of base flange 130 to flow into subsequent interior spaces 170, 172, and 174. In other embodiments, however, interior spaces 168, 170, 172, and 174 may not be in fluid communication with one another but, rather, may be entirely isolated from one another and filled with filler material 128 in any suitable manner. Alternatively, tip 118 may have any suitable number of interior spaces arranged in any suitable manner, and filler material 128 may be any suitable material that facilitates enabling tip 118 to function as described herein.

Optionally, in some embodiments, network 134 may further include a collapsible arrangement of truss-type support members (not shown) extending: (i) from base flange 130 to first rib 162 alongside first spine segment 146 so as to be embedded in filler material 128; (ii) from first rib 162 to second rib 164 alongside second spine segment 148 so as to be embedded in filler material 128; and/or (iii) from second rib 164 to third rib 166 (or third rib 166 to distal support member 132) alongside third spine segment 150, so as to be embedded in filler material 128. In this manner, the truss-type support members would be configured to provide added structural support to spine 144 and ribs 162, 164, and 166 in response to loads experienced by first blade 110 during operation of wind turbine 100. For example, in one embodiment, the truss-type support members may be configured in the manner of a scissors mechanism that uses linked, folding supports arranged in an X-type (or pantograph) pattern, thereby facilitating expansion of network 134 and providing improved load bearing properties when embedded in cured filler material 128. Alternatively, the truss-type support members may be made up of any suitable arrangement of support members (such as, for example, wire bracing) that facilitates enabling network 134 to function as described herein.

In some embodiments, rather than filler material 128 being an expandable foam material, filler material 128 may instead be a gas such as, for example, a pressurized gas or ambient air. Moreover, in other embodiments, rather than tip skin segment 124 being fluid impermeable, tip 118 may include at least one inflatable, fluid impermeable bladder (not shown) within tip skin segment 124 for containing filler material 128. For example, if the use of multiple bladders is desirable, a first foam or gas-filled bladder may be disposed within first interior space 168, a second foam or gas-filled bladder may be disposed within second interior space 170, a third foam or gas-filled bladder may be disposed within third interior space 172, and a fourth foam or gas-filled bladder may be disposed within fourth interior space 174. The bladders may be in fluid communication with one another across ribs 162, 164, and 166 or may be completely isolated from one another such that tip 118 includes at least one port 142 dedicated to each respective bladder. Alternatively, if the use of a single lengthwise extending bladder is desired, the single bladder may be in the form of a fluid impermeable sleeve that envelops ribs 162, 164, and 166 from base flange 130 to distal support member 132 to contain filler material 128. Moreover, for those embodiments in which bladder(s) are used to contain filler material 128 (either foam or gas) within tip skin segment 124, tip skin segment 124 may be fabricated from a material that is not fluid impermeable, such as a woven or braided material, e.g., a para-aramid synthetic fiber material such as a "Kevlar®" material.

Figure 4:
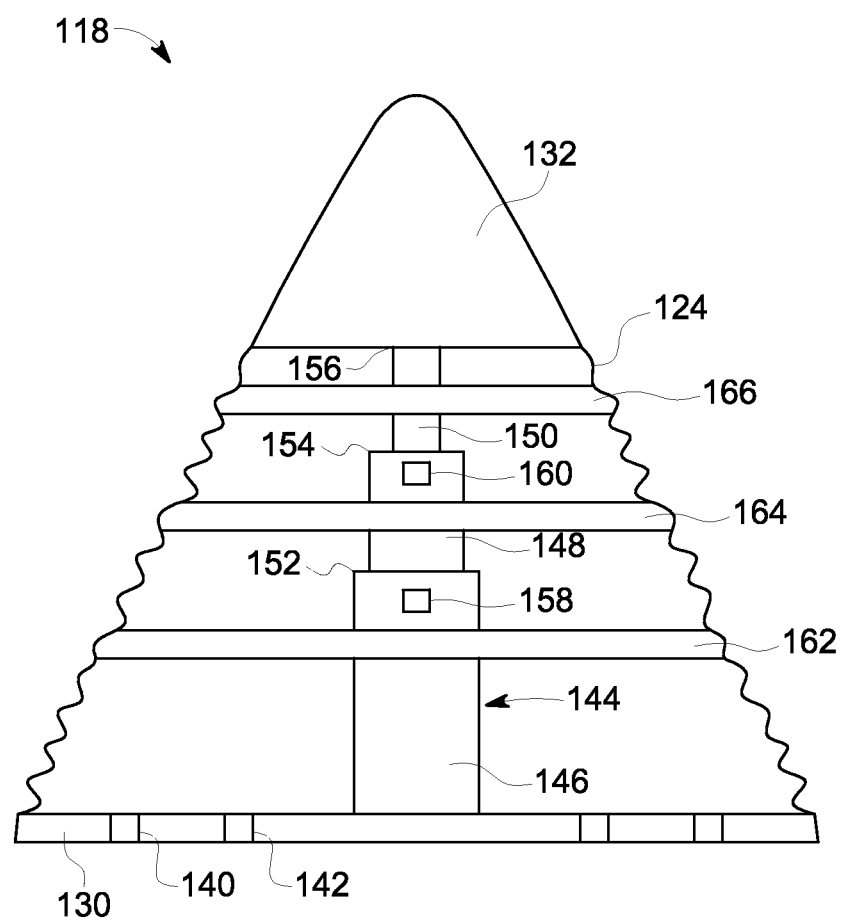
FIG. 4 is a schematic view of the tip shown in FIG. 3 in a collapsed state of assembly.

FIGS. 4 and 5 are schematic views of tip 118 in a collapsed state and an expanded state, respectively, during assembly. In the collapsed state (FIG. 4), interior spaces 168, 170, 172, and 174 (shown in FIG. 5) are not yet occupied by filler material 128, permitting second spine segment 148 to be in a telescopically retracted position relative to first spine segment 146, and permitting third spine segment 150 to be in a telescopically retracted position relative to second spine segment 148. Moreover, because distal support member 132 is closer to base flange 130, then tip skin segment 124 is not under tension but, rather, is folded in an accordion-like manner between base flange 130 and distal support member 132. As such, first rib 162, second rib 164, third rib 166, and distal support member 132 are (or are nearly) stacked atop of one another.

To convert tip 118 from the collapsed state of FIG. 4 to the expanded state of FIG. 5 during assembly of tip 118, second spine segment 148 is telescopically withdrawn from first spine segment 146 in a direction D until first locking mechanism 158 locks second spine segment 148 in its protracted position. Similarly, third spine segment 150 is telescopically withdrawn from second spine segment 148 in direction D until second locking mechanism 160 locks third spine segment 150 in its protracted position. As a result, ribs 162, 164, and 166 are further separated from one another to define interior spaces 168, 170, 172, and 174 and cause tip skin segment 124 to be placed under tension about the periphery of ribs 162, 164, and 166 to define the airfoil shape of tip 118. Notably, in some embodiments, it may be desirable to fabricate tip skin segment 124 shorter than the length of tip 118 as defined from base flange 130 to distal support member 132 when spine segments 146, 148, and 150 are locked in their protracted positions, such that tip skin segment 124 is placed under increased tension to facilitate performing the filler material controlling and containing functions described below. After spine segments 148, 150 are locked in their protracted positions by locking mechanisms 158, 160, filler material 128 is injected (under pressure) into first interior space 168 using port(s) 142 of base flange 130. Because interior spaces 168, 170, 172, and 174 are in fluid communication with one another, filler material 128 is permitted to flow from first interior space 168 into subsequent interior spaces 170, 172, and 174 until all interior spaces 168, 170, 172, and 174 are sufficiently occupied by filler material 128.

After filler material 128 has been injected into interior spaces 168, 170, 172, and 174, port(s) 142 are sealed, and filler material 128 is permitted to cure, thereby embedding spine 144, ribs 162, 164, and 166, and/or any associated truss-type supports within filler material 128 such that tip 118 is permanently fixed in its expanded state. Because tip skin segment 124 has already been put under tension prior to the injection of filler material 128, the tension of tip skin segment 124 serves to control (or constrain) the expansion of filler material 128, i.e., bulges of filler material 128 in the airfoil shape of tip skin segment 124 are inhibited. In other words, tip skin segment 124 takes on the final airfoil shape of tip 118 as a result of tip skin segment 124 being tensioned over ribs 162, 164, and 166, meaning that the final airfoil shape is formed before filler material 128 is injected such that filler material 128 merely occupies the predefined interior spaces 168, 170, 172, and 174 to facilitate maintaining the final airfoil shape, rather than being relied upon for defining the final airfoil shape of tip 118. In this manner, tip 118 has an airfoil shape that was created without the use of a mold. Moreover, filler material 128 also provides support against inward deformations of (or indentations in) tip skin segment 124 that may result from loads experienced by tip 118 during operation of wind turbine 100, and filler material 128 further provides added structural support for network 134 to facilitate maintaining tip 118 in its expanded state.

Once filler material 128 cures, tip 118 is said to be in the completely assembled state of FIG. 3 and is suitable for attachment to body 120 by inserting bolts through bolt holes 140 of base flange 130. In this manner, tip 118 may be transported to the installation site of wind turbine 100 in its collapsed state, thereby enabling easier and less expensive transport of first blade 110. For example, in some embodiments, body 120 may be molded as a monolithic structure at a site remote from the installation site of wind turbine 100, and body 120 may then be transported to the installation site in its monolithic state. By contrast, tip 118 may be assembled into its collapsed state (FIG. 4) at a site remote from the installation site of wind turbine 100, and the collapsed tip 118 may then be transported to the installation site for conversion from its collapsed state into its expanded state (FIG. 5) at the installation site. In one embodiment, for example, body 120 may be hollow (at least in part), and collapsed tip 118 may be configured for storage within body 120 during transport of body 120 to the installation site. As such, first blade 110 has a modular configuration, with tip 118 being formed separately from, and suitably attachable to, body 120. Moreover, by being transportable in a collapsed state, tip 118 allows the length of first blade 110 to be increased and, therefore, the swept area of wind turbine 100 to be increased, while minimizing costs associated with transporting first blade 110 to the installation site.

Suitably, various other embodiments of the above-described methods and systems are contemplated. In one embodiment, it may be beneficial to fabricate a network of internal support members for body 120 in the same manner as network 134 of intermediate support members of tip 118, in that body 120 would then have an expandable network of internal support members within body skin segment 122 so as to be expandable like tip 118. However, in such an embodiment where body 120 is expandable, tip 118 may not be expandable. For example, tip 118 may have a network of intermediate support members that is not configured for expansion. Rather, tip 118 may instead be a rigid, monolithic structure that is coupled to body 120 only after body 120 has been expanded. Alternatively, tip 118 and body 120 may be fabricated to be expandable together as one, such that tip 118 and body 120 share a single skin and a single network of support members within the skin to render the entire first blade 110 expandable in the manner set forth above for tip 118. Optionally, other embodiments of first blade 110 may have any suitable arrangement of blade sections that are (or are not) individually expandable and subsequently coupled together.

Moreover, it may also be beneficial to configure network 134, e.g., spine 144, for assisted (or completely automated) expandability, thereby making the expansion process easier. For example, spine segments 146, 148, and 150 may be spring-loaded relative to one another in direction D such that spine segments 146, 148, and 150 are biased into their protracted positions, or a hydraulic lift system may be operatively coupled to spine 144 to provide for automatic actuation of spine 144 into its expanded state. In some embodiments, it may also be desirable to attach tip 118 to body 120 before expanding tip 118 and before injecting filler material 128 into tip skin segment 124, such that tip 118 is expandable and filler material 128 is injectable after the collapsed tip 118 has already been attached to body 120. Additionally, in embodiments having filler material 128 that is a gas, it may be beneficial to provide a pneumatic pump that is configured for adding and removing gas from tip 118 during operation of wind turbine 100, thereby rendering the length of first blade 110 adjustable during operation of wind turbine 100 by virtue of filling or emptying gaseous filler material 128 on-demand. For example, interior spaces 168, 170, 172, and 174 may be connected in fluid communication using fluid conduits having valves that are selectively operable to facilitate emptying interior spaces 168, 170, 172, and 174 independently of one another, i.e., one of interior spaces 168, 170, 172, and 174 may be emptied during operation while another one of interior spaces 168, 170, 172, and 174 is not emptied. Alternatively, a blade kit may be provided in some embodiments, and the blade kit may include one body 120 and a plurality of differently sizable tips 118 configured for selective (or interchangeable) attachment to body 120.

It should also be noted that, if a gaseous filler material 128 is utilized and a pneumatic pump(s) are provided for filling/emptying the gaseous filler material 128, wind turbine 100 may also be provided with a processing unit to facilitate actuation of the pneumatic pump(s) in the manner set forth above. The processing unit may suitably include at least one processor, a memory device coupled to the processor, and at least one input/output (I/O) conduit, wherein the conduit includes at least one I/O channel. As used herein, the term processor is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein. In the embodiments described herein, the memory device may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used.

In the embodiments described herein, I/O channels may be associated with, but are not limited to, computer peripherals associated with an operator interface such as a mouse and a keyboard. Alternatively, other computer peripherals may also be used that may include, for example, but not be limited to, a control module for use by an operator in controlling the pneumatic pumps(s) in real time. Furthermore, in the exemplary embodiment, additional I/O channels may be associated with, but not be limited to, an operator interface monitor or a communications link for remotely controlling the pneumatic pump(s). Moreover, the processor may suitably process information transmitted from a plurality of other electronic devices of wind turbine 100. The memory device and the storage devices store and transfer information and instructions to be executed by the processor. The memory device and the storage devices may also be used to store and provide temporary variables, static, i.e., non-volatile and non-changing, information and instructions, or other intermediate information to the processor during execution of instructions by the processor. Instructions that are executed include, but are not limited to, analysis of signals transmitted from suitably located pressure sensors within tip 118 and/or other suitable devices configured to facilitate a desired actuation sequence of the pneumatic pump(s). The execution of sequences of instructions is not limited to any specific combination of hardware circuitry and software instructions.

The above-described embodiments facilitate providing a lightweight wind turbine blade that may be manufactured in a modular fashion. The devices, systems, and methods also facilitate improving the portability of wind turbine components such as, for example, outboard blade extensions and portable wind turbines as a whole, e.g., for use in providing distributed or tactical military power. The embodiments disclosed herein further facilitate enhancing logistics and easing transportation/installation of a wind turbine in a manner that enables some sections of a blade to be finished in a more controlled environment away from an installation site, with other sections of the blade being finished at the installation site in a less controlled environment. Additionally, the embodiments facilitate customizing the structural characteristics of an outboard blade section at the installation site (or on-demand during operation of the wind turbine) to suit local wind conditions, expected annual energy production (AEP), desired noise, and/or desired business value. The above-described embodiments also facilitate utilizing a "thorny" spine that is optionally made from a high-strength composite material to provide increased load-transferring contact with a lightweight foam filler material that serves a shape-filling function. Such filler material may be contained within one or more bladders disposed within an outer skin made of modern high-performance fiber that provides surface integrity. The disclosed embodiments further facilitate injecting a lightweight filler, e.g., without limitation, a foam or a gas, into a blade skin in-situ to provide rigidity for transferring operational loads to structural elements of the blade.

An exemplary technical effect of the methods, systems, and apparatus described herein includes at least one of: (a) providing a lightweight wind turbine blade that may be manufactured in a modular fashion; (b) improving the portability of wind turbine components such as, for example, outboard blade extensions and portable wind turbines as a whole, e.g., for use in providing distributed or tactical military power; (c) enhancing logistics and easing transportation/installation of a wind turbine in a manner that enables some sections of a blade to be finished in a more controlled environment away from an installation site, with other sections of the blade being finished at the installation site in a less controlled environment; (d) customizing the structural characteristics of an outboard blade section at the installation site (or on-demand during operation of the wind turbine) to suit local wind conditions, expected annual energy production (AEP), desired noise, and/or desired business value; (e) utilizing a "thorny" spine that is optionally made from a high-strength composite material to provide increased load-transferring contact with a lightweight foam filler material that serves a shape-filling function, such filler material being containable within one or more bladders disposed within an outer skin made of modern high-performance fiber that provides surface integrity; and (f) injecting a lightweight filler, e.g., without limitation, a foam or a gas, into a blade skin in-situ to provide rigidity for transferring operational loads to structural elements of the blade.

Exemplary embodiments of wind turbine blade systems and methods of assembling the same are described above in detail. The systems and methods are not limited to the specific embodiments described herein, but, rather, components of the systems and/or steps of the methods may be utilized independently and separately from other components and/or steps described herein. For example, the methods may also be used in combination with other systems and methods, and are not limited to practice with only wind energy related systems and methods as described herein. Rather, the embodiments may be implemented and utilized in connection with many other applications outside of the wind energy field.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A wind turbine blade comprising:
a first section;
a second section adjacent said first section; and
a hydraulic lift system, wherein at least one of said first section and said second section comprises a skin segment and a network of support members disposed within said skin segment, said network of support members configured for expansion, said hydraulic lift system configured to expand said network of support members to an expanded state, said network of support members comprising a telescopic spine, said telescopic spine comprising a first spine segment, a second spine segment, and a locking mechanism configured to permanently lock said first spine segment relative to said second spine segment after said network of support members is in the expanded state such that said network of support members cannot retract said network of support members remains in a state of permanent expansion; and wherein a filler material is injected into an interior space therefore embedding said support members such that the at least one of said first section and said second section is permanently fixed in its expanded state.

2. The wind turbine blade in accordance with claim 1, wherein said first section comprises a base flange configured for attaching said first section to said second section.

3. The wind turbine blade in accordance with claim 1, wherein said network of support members further comprises a plurality of airfoil-shaped ribs connected to said spine.

4. The wind turbine blade in accordance with claim 1, wherein said at least one of said first section and said second section comprises said foam filler material between said network of support members when in the expanded state and said skin segment.

5. The wind turbine blade in accordance with claim 4, wherein said at least one of said first section and said second section comprises a port for injecting said foam filer material.

6. The wind turbine blade in accordance with claim 1, wherein said locking mechanism comprises an aperture defined by said first spine segment and a spring-loaded detent disposed on said second spine segment, and wherein said locking mechanism locks said first spine segment relative to said second spine segment by insertion of said spring-loaded detent into said aperture.

7. The wind turbine comprising:
a tower; and
a rotor mounted on said tower, wherein said rotor comprises a hub and a plurality of blades extending from said hub, one of said blades comprising:
a first section;
a second section adjacent said first section; and
a hydraulic lift system, wherein at least one of said first section and said second section comprises a skin segment and a network of support members disposed within said skin segment, said network of support members configured for expansion, said hydraulic lift system configured to expand said network of support members to an expanded state, said network of support members comprising a telescopic spine, said telescopic spine comprising a first spine segment, a second spine segment, and a locking mechanism configured to permanently lock said first spine segment relative to said second spine segment after said network of support members is in the expanded state such that said network of support members cannot retract said network of support members remains in a state of permanent expansion; and wherein a filler material is injected into an interior space therefore embedding said support members such that the at least one of said first section and said second section is permanently fixed in its expanded state.

8. The wind turbine in accordance with claim 7, wherein said first section comprises a base flange configured for attaching said first section to said second section.

9. The wind turbine in accordance with claim 7, wherein said network of support members further comprises a plurality of airfoil-shaped ribs connected to said spine.

10. The wand turbine in accordance with claim 7, wherein said at least one of said first section and said second section comprises said foam filler material between said network of support members when in the expanded state and said skin segment.

11. The wind turbine in accordance with claim 10, wherein said at least on of said first section and said second section comprises a port for injecting said foam filler material.

12. The wind turbine in accordance with claim 7, wherein said locking mechanism comprises an aperture defined by said first spine segment and a spring-loaded detent disposed on said second spine second, and wherein said locking mechanism locks said first spine segment relative to said second spine segment by insertion of said spring-loaded detent into said aperture.

13. A method of assembling a wind turbine blade, said method comprising:
providing a collapsed network of support members for a section of the blade, the network of supports including a telescopically expandable spine, the telescopically expandable spine including a first spine segment, a second spine segment, and a locking mechanism configured to permanently lock the first spine segment relative to the second spine segment such that the network of support members cannot retract after expansion of the telescopically expandable spine to an expanded state using a hydraulic lift system; and attaching a skin segment to the network of support members such that the network of support members is disposed within the skin segment, wherein the network of support members is configured for expansion to tension the skin segment such that an interior space is defined between the skin segment and the expanded network of support members said network of support members remains in a state of permanent expansion; and wherein a filler material is injected into the interior space therefore embedding said support members such that the at least one of said first spine segment and said second spine segment is permanently fixed in its expanded state.

14. The method in accordance with claim 13, wherein the network of support members includes a plurality of ribs connected to the telescopically expandable spine, said method comprising fixedly attaching the skin segment to each of the ribs to configure the skin segment for incremental tensioning upon expansion of the telescopically expandable spine using the hydraulic lift system.

15. The method in accordance with claim 13, further comprising providing the skin segment as a foldable, fluid impermeable material having a silicone-coated, glass-fiber fabric.

16. The method in accordance with claim 13, further comprising providing a hollow second section of the blade, and configuring the network of support members to be stored within the hollow second section when the network is collapsed.

\* \* \* \* \*